United States Patent [19]

Dudinyak

[11] 4,184,030

[45] Jan. 15, 1980

[54] PROCESS AND COMPOSITION FOR POLYMERIZING AND CURING METHYL METHACRYLATE MONOMER-POLYMER SYRUPS IN THE PRESENCE OF METAL SALTS OF HEMI-PERESTERS OF MALEIC ACID

[75] Inventor: Ronald S. Dudinyak, Wilmington, Del.

[73] Assignee: E. I. Du Pont de Nemours and Company, Wilmington, Del.

[21] Appl. No.: 909,558

[22] Filed: May 25, 1978

Related U.S. Application Data

[63] Continuation-in-part of Ser. No. 676,801, Apr. 14, 1976, abandoned, which is a continuation-in-part of Ser. No. 615,722, Sep. 22, 1975, abandoned.

[51] Int. Cl.$^2$ ............................................ C08L 67/02
[52] U.S. Cl. ................................. 525/248; 525/250; 428/426; 428/430; 428/442; 428/458; 428/463; 428/464; 428/480; 428/500; 428/511; 428/532
[58] Field of Search ............... 260/872, 873, 885, 875, 260/886, 884, 881; 526/329.7

[56] References Cited

U.S. PATENT DOCUMENTS

| | | | |
|---|---|---|---|
| Re. 27,093 | 3/1971 | Slocum | 260/41 |
| 3,112,320 | 11/1963 | Farkas | 260/268 |
| 3,234,194 | 2/1966 | Slocum | 526/329.7 |
| 3,362,942 | 1/1968 | Munn | 526/329.7 |
| 3,484,419 | 12/1969 | Rinkler et al. | 526/287 |
| 3,534,122 | 10/1970 | Cornell | 260/885 |
| 3,639,370 | 2/1972 | Edl et al. | 526/341 |
| 3,775,364 | 11/1973 | Duggins | 260/41 R |

*Primary Examiner*—Harry Wong, Jr.

[57] ABSTRACT

In the use of certain metal salts of the hemi-perester of maleic acid as catalysts for the polymerization and curing of ethylenically unsaturated monomers and of methyl methacrylate-containing syrups the addition of an activator such as sodium bisulfite provides a substantial reduction in the curing time. The process is relatively insensitive to the amount of filler used. The salts of maleic hemi-peresters, in combination with the activators, are also useful for polymerizing ethylenically unsaturated monomers.

7 Claims, No Drawings

PROCESS AND COMPOSITION FOR POLYMERIZING AND CURING METHYL METHACRYLATE MONOMER-POLYMER SYRUPS IN THE PRESENCE OF METAL SALTS OF HEMI-PERESTERS OF MALEIC ACID

CROSS-REFERENCE TO RELATED APPLICATIONS

This application is a Continuation-In-Part of application Ser. No. 676,801, filed Apr. 14, 1976 now abandoned, which is a Continuation-In-Part of application Ser. No. 615,722, filed Sept. 22, 1975, now abandoned.

BACKGROUND OF THE INVENTION

1. Field of Invention

This invention is related to the polymerization and curing of ethylenically unsaturated monomers and of methyl methacrylate-containing syrups. More particularly, it is related to the improved, more rapid production of articles of polymeric methyl methacrylate, e.g., methacrylate homopolymer and copolymers of methyl methacrylate with alpha, beta-ethylenically unsaturated compounds such as vinyl acetate, styrene, alkyl acrylates, alkyl methacrylates, and the like.

2. Description of Prior Art

In the production of articles of polymeric methyl methacrylate and, more specifically, in the curing or polymerization of the monomers involved for producing the polymeric articles, the most important step is the curing of the methyl methacrylate-containing syrup. For this step it is necessary to use a catalyst or, as it is sometimes called, an initiator. As catalysts, the prior art has suggested the use of peroxy compounds such as lauroyl peroxide and benzoyl peroxide. Recently, the use of the hemi-perester of maleic acid has been disclosed as a useful catalyst for the polymerization and curing of methyl methacrylate-containing syrups. However, it is known that, although this catalyst is quite effective, it operates rather slowly. Thus, curing times of over four hours are not uncommon in the preparation of articles of the methyl methacrylate homopolymer when curing at or near room temperature.

The rate of curing of such methyl methacrylate-containing syrups has been increased through the use of metal salts of the hemi-peresters of maleic acid as disclosed in U.S. Pat. No. 3,362,942, issued Jan. 9, 1968 to George E. Munn. However, even this catalyst requires 1-2 hours to complete the polymerization and curing. When a mercaptan activator is included in the syrup, the curing rate can be further increased but the curing step still requires 15-20 minutes for thick sheets and the activator's high cost is disadvantageous.

SUMMARY OF THE INVENTION

According to the present invention there is provided an improved process and composition for preparing a methyl methacrylate polymer selected from the group consisting of methyl methacrylate homopolymer and copolymers of methyl methacrylate with α,β-ethylenically unsaturated compounds which includes curing a syrup containing 10-40% by weight of methyl methacrylate polymer, having an inherent viscosity of 0.25-1.0 in monomeric methyl methacrylate, in the presence of a small amount of a metal salt of a hemi-perester of maleic acid having the formula

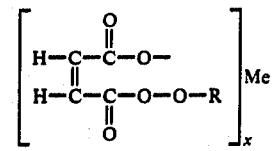

wherein
Me is a metal selected from the group consisting of Group IA metals, Group IIA metals, zinc, lead, cobalt, nickel, manganese and copper;
x is an integer having a value of from 1 to the valence of the metal; and
R is a saturated tertiary alkyl radical,
wherein the improvement comprises the presence of a salt of an oxo acid of sulfur activator selected from the group consisting of bisulfite, metabisulfite, and thiosulfate salts or of the free acid and of a polar liquid. There is further provided an improved process and composition for preparing polymers from syrups wherein the polymer dissolved in the monomer can be any conventional polymer including addition polymers, condensation polymers such as polyesters, and the like and the monomer or mixtures of monomers used to dissolve the polymer can be any monomer(s) in which the polymer is soluble. There is also provided an improved process and composition for polymerizing any ethylenically unsaturated monomer or mixtures of such monomers capable of copolymerization via free radical initiation. Optionally, inert additives, pigments, and fillers can also be present in the syrup.

DESCRIPTION OF THE INVENTION

The rate of curing of a syrup, containing 10-40% by weight of methyl methacrylate polymer having an inherent viscosity of 0.25-1.0 dissolved in monomeric methyl methacrylate in the presence of a small amount, usually 0.05-5 mole percent (preferably 0.1-1 mole percent) of a metal salt of a hemi-perester of maleic acid having the formula

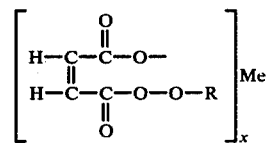

wherein
Me is a metal, preferably selected from the group consisting of Group I-A metals (sodium, potassium, lithium, etc.), Group II-A metals (calcium, magnesium, strontium, barium, etc.), zinc, lead, cobalt, nickel, manganese, and copper;
x is an integer that has a value of 1 or more up to and including the valence of the metal; and
R is a saturated tertiary alkyl radical, preferably tertiary butyl,
can be improved by the inclusion of an activator which can increase the rate of decomposition of the hemi-perester and thereby the rate of polymerization and curing. Activators have been used previously to increase rates of polymerization. Redox initiator systems are well known in emulsion polymerization wherein oxidation-reduction steps rapidly generate free radicals capable of initiating polymerization reactions of α,β-ethylenically unsaturated monomers. Activation of polymerization reactions, initiated by peroxide initiators, with tertiary amines which induce the decomposition of peroxides into free radicals, are also well known to those skilled in the art. Use of mercaptans to increase the rate of polymerization of hemi-perester initiated polymerization and curing of methyl methacrylate-containing syrups has been described in U.S. Pat. No. 3,362,942, hereby incorporated by reference.

The activator of this invention is a salt of an oxo acid of sulfur or the free acid. While the exact mechanism of activation is not known, it is thought that those members of this group whose anions are capable of reacting with the double bond of the maleic hemi-perester are effective in increasing the rate of polymerization and cure. Among useful salts are included bisulfites, thiosulfates, and metabisulfites, the latter, when dissolved in water, are known to generate bisulfites, thought to be the active species which co-react with the hemi-peresters of maleic acid. Of these, preferred salts are those having cations selected from the group consisting of Group IA metals, Group IIA metals, and ammonium. The activator is present in a weight ratio to the hemi-perester of maleic acid of from approximately 1:7 to 4:1, preferably from 1:7 to 1:1, and even more preferably for optimum cure rates, in a ratio of approximately 1:3 to 1:1. Most preferred are the weight ratios of from 1:1.2 to 1:1. The activator can be added to the syrup in the form of an aqueous solution. Increased levels of water can further increase the rate of polymerization and cure in some instances.

The starting syrup or polymer-in-monomer solution can be prepared by any of the methods described in British Pat. No. 870,191 or U.S. Pat. No. 3,154,600. Specifically, the syrup can be made by heating a small amount of a polymerization initiator in a solution in the methacrylic ester, in the optical presence of a chain transfer agent, at a suitable pressure and temperature. Heating is continued until the solution reaches a predetermined viscosity. Thereafter, the hot solution is quenched by the addition of cold monomer containing a polymerization inhibitor. More specifically, a syrup having a viscosity of 0.5–50 poises at 25° C. can be produced from methyl methacrylate by heating the monomeric methyl methacrylate in a jacketed kettle at a temperature of 50°–150° C. under refluxing conditions. Atmospheric pressure is used and the refluxing material is stirred. Heating is conducted in the presence of a very small amount of initiator. When a bulk viscosity in the range of 0.5–50 poises and an inherent viscosity of 0.25–1.0 is attained and the initiator content has been reduced substantially to zero, i.e., below 20 parts per million, the polymerization is stopped by cooling in any suitable manner. One method of cooling involves adding 1–10% by weight of cold methyl methacrylate containing sufficient hydroquinone or other polymerization inhibitor to inhibit further polymerization of the methyl methacrylate.

For the purpose of the present invention, a final solution contains 10–40% by weight of the methyl methacrylate polymer dissolved in the methyl methacrylate monomer. The polymer has an inherent viscosity of 0.25–1.0 determined at 20° C. using a solution of 0.50 gram of the polymer per 100 milliliters of chloroform in accordance with the method described in F. W. Billmeyer, Textbook of Polymer Chemistry, Interscience Publishing Inc. (1957), p. 128. As mentioned previously, the polymer can also be a copolymer involving a major portion of the methyl methacrylate monomer with such monomers as vinyl acetate, styrene, methyl acrylate, ethyl acrylate, butyl acrylate, cyclohexyl acrylate, 2-ethylhexyl acrylate, acrylonitrile, ethyl methacrylate, butyl methacrylate, cyclohexyl methacrylate, 2-ethylhexyl methacrylate, methacrylonitrile, and the like.

Furthermore, the polymer can be any conventional polymer such as addition polymers and condensation polymers. Among the addition polymers are included acrylic and methacrylic homo- and copolymers with ethylenically unsaturated monomers or mixtures of such monomers wherein methyl methacrylate is not the major portion of the polymer; homo- and copolymers of ethylenically unsaturated monomers wherein the unsaturated monomer is at least one of styrene, substituted styrenes such as alpha-methylstyrene, ring-substituted styrenes, and the like; vinyl esters such as vinyl acetate, vinyl propionate, and the like; alpha-olefins such as ethylene, propylene, 1-butene, 1-octene, and the like, vinyl chloride, vinylidene chloride; conjugated dienes such as 1,3-butadiene; olefins containing fluorine such as vinyl fluoride, trichlorofluoroethylene, tetrafluoroethylene, hexafluoropropylene; vinyl and allyl ethers; and mono- and di-esters of alpha,beta-ethylenically unsaturated dicarboxylic acids such as mono- and dialkyl maleates, mono- and dialkyl fumarates, mono- and dialkyl itaconates. The choice of these monomers can be dicated by the intended end use of the polymers obtained in this invention as long as the monomer or monomers are capable of homo- and or copolymerization via free radical initiation.

Among the condensation polymers that can be utilized with the maleic acid perester-oxo acid of sulfur activator system of this invention are polyesters and polyethers well known to those skilled in the art. The diols utilized in preparing the polyesters can be aliphatic or aromatic. Suitable diols include: ethylene glycol; propylene-1,2-glycol; propylene-1,3-glycol; butylene-1,3-diol; butylene-1,4-diol; butylene-2,3-diol; neopentylglycol; 2,2-diethylpropane-1,3-diol; 2-methyl-2-propylpropane-1,3-diol; decamethylene glycol; dodecamethylene glycol; monoethyl ether of glycerine; alpha,beta-allyl ethers of glycerol, and the like.

The dicarboxylic acids utilized in preparing the polyesters can be aliphatic, cycloaliphatic, both saturated and unsaturated or aromatic. Suitable dicarboxylic acids include: malonic, succinic, glutaric, adipic, pimelic, suberic, azelaic, sebacic, brassylic, maleic, fumaric, dilinoleic, diphenic, tetrachlorophthalic, isophthalic, terephthalic, orthophthalic acids, cyclohexane 1,2-dicarboxylic acid, p-phenylene diacetic, naphthalene dicarboxylic acid, dihydromuconic acid, beta-methyl adipic acid, trimethyl adipic acid, ethylether-2,2'-dicarboxylic acid, and the like.

If desired, one can use anhydrides of the above dicarboxylic acids such as phthalic anhydride, tetrahydrophthalic anhydride and the like. If desired, one can also use acid chlorides of the above dicarboxylic acids.

Among the polyethers are included polyethylene glycol and polypropylene glycol.

Naturally occurring polymers such as the cellulosics and their derivatives can also be utilized in this invention.

The monomer or mixtures of monomers used to prepare syrups of the polymers can be any of the monomers mentioned above provided that the monomer(s) is capable of substantially dissolving the polymer and is capable of homopolymerizing or copolymerizing with any other monomer present. Preferably, the syrups so prepared contain 10-40% by weight of a polymer, substantially dissolved in the monomer(s). Preferably, the syrups of the polymers contain, as the polymeric components, addition polymers, such as polymethyl methacrylate and copolymers of methyl methacrylate with alpha,beta-ethylenically unsaturated compounds, and polyesters and, as the monomeric components, alpha,-beta-unsaturated monomers or mixtures thereof, such as those selected from the group: esters of acrylic and methacrylic acid and styrene. In case of very high molecular weight polymers, syrups can be prepared at polymer concentrations as low as 1%.

The syrup can also contain a crosslinking agent, added to the syrup in an amount of up to 20% by weight upon completion of quenching. Any suitable polyunsaturated crosslinking agent can be used, e.g., ethylene dimethacrylate, propylene dimethacrylate, polyethylene glycol dimethacrylate, trimethylolpropane triacrylate, pentaerythritol tetramethacrylate, divinyl benzene, triallyl cyanurate, and diallyl phthalate. If desired, a portion, i.e., up to about 2% of the crosslinking agent can be added to the syrup prior to quenching.

The maleic acid perester salt-oxo acid of sulfur activator system of this invention, in the presence of a polar liquid such as water, is also capable of initiating the polymerization of ethylenically unsaturated monomers or mixtures of such monomers. Among the monomers which can be polymerized with this system are included acrylic and methacrylic acids, their esters, substituted and unsubstituted amides, nitriles; styrene, substituted styrenes such as alpha-methylstyrene, ring-substituted styrenes, and the like; vinyl esters such as vinyl acetate, vinyl propionate, and the like; alpha-olefins such as ethylene, propylene, 1-butene, 1-octene, and the like, vinyl chloride, vinylidene chloride; conjugated dienes such as 1,3-butadiene; olefins containing fluorine such as vinyl fluoride, trichlorofluoroethylene, tetrafluoroethylene, hexafluoropropylene; vinyl and alkyl ethers; and mono- and di-esters of alpha,beta-ethylenically unsaturated dicarboxylic acids such as mono- and dialkyl maleates, mono- and dialkyl fumarates, mono- and dialkyl itaconates, and mixtures thereof as long as such monomers or mixtures of monomers are capable of homo- and copolymerization. The initiator system of this invention is capable of initiating a polymerization reaction at or near room temperature.

Specifically, the process of this invention involves adding to the polymer-in-monomer solution or to the monomer(s) the hemi-perester of maleic acid, e.g., monotertiary-butyl peroxymaleate, sometimes referred to as t-butyl permaleic acid, in combination with a basic compound of the desired metal. As such basic compounds, one can use any metal compound that will react with the acid substituent of the hemi-perester to form the metal salt of the hemi-perester. Such basic compounds include but are not limited to the oxides or hydroxides of the metal; the carbonates of sodium, potassium or zinc; the acetates of sodium, potassium, copper, strontium, magnesium, lead, cobalt, manganese; the octoates of calcium, zinc, magnesium; the acid phthalates, bicarbonates, benzoates, phosphates, sulfides, methacrylates, etc. of sodium and potassium or mixtures thereof. Conveniently, the activator can be the last ingredient to be added. A very useful mode of conducting the process involves the dissolution of the hemi-perester in one portion of the syrup and the suspension of the basic compound in another portion of the syrup.

The polymerization and/or curing is accomplished in any case autogenically by merely exposing the monomers or the syrup containing the metal salt of the hemi-perester of maleic acid and an activator to a temperature of 15-40° C. Although elevated temperatures and higher pressures may be used, they are not necessary.

Utilization of the activator of this invention increases the rate of cure of a syrup when compared to mercaptan containing activators. In a typical curing experiment, utilizing sodium bisulfite activator, curing, as measured by the length of time required for the exothermic reaction to peak, was obtained in 7.5 minutes. In a control experiment, utilizing the diester of ethylene glycol and mercaptoacetic acid, curing was obtained in 14 minutes. Alternatively, the advantage of the activator of this invention can be seen in the ability to obtain the same rate of cure possible with prior art activator but needing only diminished amounts of the hemi-perester.

The syrup can be mixed with as much as 85% by weight of an inert additive without adversely affecting the improvements obtained by the process of this invention. Such additives include glass fibers, powdered metals, inert particles, pigments, alumina, alumina trihydrate, calcium carbonate, natural and synthetic fibers and any other toughening, filling, coloring or strengthening materials. Such fillers can be any of those that do not interfere with the polymerization of the acrylic resin.

The syrups of the present invention including the metal salt of the hemi-perester of maleic acid and an activator can be used to fabricate all types of polymeric articles. Thus, the syrup can be poured on a corrugated surface to produce sheets. The syrups can be poured into molds or over fabrics, metals or layers of glass to provide useful products. The syrup can also be used as a laminating layer for wood and other plastics.

A preferred hemi-perester for forming the metal salt thereof is monotertiary-butyl peroxymaleate. However, other useful hemi-peresters include those where the saturated tertiary alkyl of the hemi-perester is t-amyl, 1-methylcyclohexyl and p-menthyl. The metal salt of the hemi-perester is usually present in an amount greater than 0.05 mole percent based on the syrup in order to obtain the advantages of the present invention. The upper limit of 5 mole percent is merely to indicate that no additional advantage seems to be obtained by adding more than that percentage of the salt.

In the following Examples illustrating the invention, all parts are by weight unless otherwise indicated.

EXAMPLE 1

A syrup of 18% methyl methacrylate homopolymer in methyl methacrylate monomer, the polymer having a viscosity of about 50 centipoises, is prepared by partial polymerization in situ substantially in the manner described in Example I of U.S. Pat. No. 3,154,600, but without the use of the mercaptoacetic acid.

To 35 parts of this syrup are added 65 parts of alumina trihydrate, 0.30 part of a 30% paste of calcium hydroxide in the syrup, 0.80 part of a 25% solution of monotertiary-butyl peroxymaleate in a 1:2 by weight solution of methanol an methyl methacrylate, and 0.5 part of a 33% aqueous solution of sodium metabisulfite corresponding to bisulfite:hemi-perester ratio of 1:1.4. Prior to the addition of the last ingredient, the mixture is heated to 30° C. The final mix is cast in 2.5 inch diameter dishes to have a thickness of 0.75 inch. Curing is obtained in 7.5 minutes. The cured sheet is translucent and shows no blushing (whitening) after immersion in 70° C. water for 16 hours.

EXAMPLES 2-7

To 101.1 part-portions of the mixture as prepared in Example 1 prior to the addition of the activator, preheated to 30° C. are added, respectively, 0.4, 0.6, 0.2, 0.1, 0.7, and 0.3 part of a 33% aqueous solution of sodium bisulfite. Cast as above, the following curing times are observed as shown in Table 1:

TABLE I

| Example | Ratio Sodium bisulfite: tert-butyl peroxymaleate | Cure Time (minutes) |
| --- | --- | --- |
| 1 | 1:1.4 | 7.5 |
| 2 | 1:1.2 | 8.6 |
| 3 | 1:1 | 7.5 |
| 4 | 1:3 | 13.5 |
| 5 | 1:6 | 28 |
| 6 | 1:0.94 | 28 |
| 7 | 1:2 | 12.5 |

EXAMPLE 8

Utilizing 101.1 parts of the mixture as prepared in Example 1, prior to the addition of the activator, the following additional ingredients are added: water, 0.1 part; zinc octoate, 0.1 part; and the diester of ethylene glycol and mercaptoacetic acid, 0.1 part. Curing time in this control experiment is 14 minutes.

What is claimed is:

1. An improved mixture for preparing polymeric articles consisting of a syrup containing 1–40% by weight of a polymer substantially dissolved in an ethylenically unsaturated monomer or mixtures thereof, and a small amount of a metal salt of a hemi-perester of maleic acid having the formula

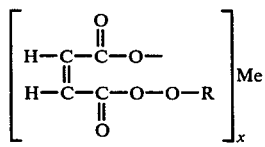

wherein
Me is a metal selected from the group consisting of Group IA metals, Group IIA metals, zinc, lead, cobalt, nickel, manganese and copper;
x is an integer having a value of from 1 to the valence of the metal; and
R is a saturated tertiary alkyl radical
wherein the improvement comprises the presence of a salt of an oxo acid of sulfur activator selected from the group consisting of bisulfite, metabisulfite and thiosulfate salts or the free acid and the presence of a polar liquid.

2. The improved mixture of claim 1 containing in said syrup 10–40% by weight of said polymer.

3. The improved mixture of claim 2 wherein said polymer component of said syrup is an addition polymer or a condensation polymer.

4. The improved mixture of claim 1 wherein said ethylenically unsaturated monomer is selected from the group consisting of: acrylic acid, methacrylic acid, esters, amides and nitriles of acrylic and methacrylic acids, styrene, alpha-methylstyrene, ring-substituted styrenes, vinyl esters, alpha-olefins, conjugated dienes, vinyl chloride, vinylidene chloride, vinyl fluoride, tetrafluoroethylene, hexafluoropropylene, trichlorofluoroethylene, and mono- and dialkyl esters of maleic, fumaric, and itaconic acids, with the proviso that said monomers or mixtures of monomers are capable of homopolymerization or copolymerization.

5. The improved mixture of claim 3 wherein said activator and said polar liquid are present as an aqueous solution of sodium bisulfite or sodium metabisulfite.

6. An improved mixture for preparing polymeric articles consisting essentially of a syrup containing 10–40% by weight of a polyester substantially dissolved in an alpha,beta-ethylenically unsaturated compound or mixtures thereof, and a small amount of a metal salt of a hemi-perester of maleic acid having the formula

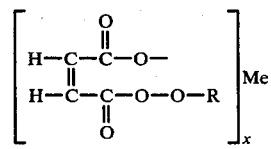

wherein
Me is a metal selected from the group consisting of Group IA metals, Group IIA metals, zinc, lead, cobalt, nickel, manganese and copper;
x is an integer having a value of from 1 to the valence of the metal; and
R is a saturated tertiary alkyl radical
wherein the improvement comprises the presence of a salt of an oxo acid of sulfur activator selected from the group consisting of bisulfite, metabisulfite and thiosulfate salts or the free acid and the presence of a polar liquid.

7. The mixture of claim 6 wherein said salt of an oxo acid of sulfur activator is present in a ratio to said salt of hemi-perester of maleic acid of from approximately 1:7 to approximately 4:1 by weight.

* * * * *